United States Patent
Li (10) Patent No.: US 12,014,233 B1
(45) Date of Patent: *Jun. 18, 2024

(54) ELECTRONIC TAG DEVICE FOR OBTAINING ON-BOARD DIAGNOSTICS (OBD) DATA FROM A VEHICLE AND TRANSMITTING THE DATA VIA RFID TAG TO EXTERNAL SERVER

(71) Applicant: Bing xuan Li, Hsinchu (CN)

(72) Inventor: Bing xuan Li, Hsinchu (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/519,863

(22) Filed: Nov. 27, 2023

(51) Int. Cl.
*G06K 19/07* (2006.01)
*H04W 4/02* (2018.01)

(52) U.S. Cl.
CPC .......... *G06K 19/0723* (2013.01); *H04W 4/02* (2013.01)

(58) Field of Classification Search
CPC ............................ G06K 19/0723; H04W 4/02
See application file for complete search history.

(56) References Cited

U.S. PATENT DOCUMENTS

| | | | |
|---|---|---|---|
| 11,605,876 B1 | 3/2023 | Li | |
| 11,640,511 B1 | 5/2023 | Li | |
| 11,758,392 B1 | 9/2023 | Li | |
| 2013/0006469 A1* | 1/2013 | Green | B60R 21/013 701/1 |
| 2014/0205155 A1* | 7/2014 | Chung | G06V 40/10 382/115 |
| 2014/0207629 A1* | 7/2014 | Bradley | B60R 25/00 705/28 |
| 2020/0344602 A1* | 10/2020 | Li | H04L 67/125 |

FOREIGN PATENT DOCUMENTS

CN 211790744 U * 10/2020

OTHER PUBLICATIONS

Surge protection device by Li, Hong-jun et al. (CN 211790744 U) (Year: 2020).*

* cited by examiner

*Primary Examiner* — Omer S Khan
(74) *Attorney, Agent, or Firm* — Zhigang Ma (57) ABSTRACT

An electronic tag device is provided and includes: a housing and a circuit board. The housing defines an accommodating cavity, and the circuit board is detachably disposed in the accommodating cavity. The circuit board is provided with a controller, a radio frequency identification (RFID) tag circuit connected to the controller, and a cellular communication and positioning circuit connected to the controller. The electronic tag device has multiple functions, thereby to meet the actual needs of users.

18 Claims, 5 Drawing Sheets

ELECTRONIC TAG DEVICE FOR OBTAINING ON-BOARD DIAGNOSTICS (OBD) DATA FROM A VEHICLE AND TRANSMITTING THE DATA VIA RFID TAG TO EXTERNAL SERVER

TECHNICAL FIELD

The disclosure relates to the field of electronic tag communication technologies, in particular to an electronic tag device.

BACKGROUND

With the rapid development of Internet of Things (IoT) technology, radio frequency identification (RFID) electronic tags have been widely used in industrial automation, commercial automation and many other fields. The RFID electronic tags belong to a non-contact automatic identification technology. They use radio frequency signals to identify target objects and obtain relevant data. The identification work does not require manual intervention. As a wireless version of barcode, the RFID technology has the advantages of waterproof, antimagnetic, high temperature resistant, long service life, large reading distance, data on the tag can be encrypted, larger storage capacity, free change of storage information, etc.

However, existing RFID electronic tags each have single function, which cannot meet the actual needs of users.

SUMMARY

The disclosure provides an electronic tag device, the electronic tag device have multiple functions to meet the actual needs of users.

The disclosure provides the electronic tag device, including: a housing and a circuit board. The housing defines an accommodating cavity, the circuit board is detachably disposed in the accommodating cavity, and the circuit board is provided with a controller, a radio frequency identification (RFID) tag circuit connected to the controller, and a cellular communication and positioning circuit connected to the controller. The controller is configured (i.e., structured and arranged) to obtain first target on-board diagnostics (OBD) data from a vehicle and convert the first target OBD data to obtain converted first target OBD data meeting ISO18000-6C, and the RFID tag circuit is configured to obtain the converted first target OBD data meeting ISO18000-6C from the controller and store the converted first target OBD data meeting ISO18000-6C, to thereby allow a first server to obtain the converted first target OBD data meeting ISO18000-6C from the RFID tag circuit. The cellular communication and positioning circuit is configured to obtain current positional data of the electronic tag device and transmit the current positional data to a second server, to thereby enable the second server to output a tag data updating instruction in response to a current geographical region where the electronic tag device is located determined by the current positional data is different from a previously determined geographical region, wirelessly receive the tag data updating instruction from the second server, and transmit the tag data updating instruction to the controller; and the controller is configured to obtain a target set of tag data corresponding to the tag data updating instruction from multiple sets of tag data and transmit the target set of tag data to the RFID tag circuit for tag data updating.

In an embodiment, the housing includes a first cover and a second cover; the second cover is detachably connected with the first cover and defines the accommodating cavity cooperative with the first cover; and the circuit board is detachably connected with the second cover.

In an embodiment, the circuit board is further provided with a first antenna connector and a second antenna connector, which are electrically connected with the cellular communication and positioning circuit; the housing defines a first through-hole and a second through-hole; and the first through-hole is configured to expose the first antenna connector and allow a cellular communication antenna to connect the first antenna connector, and the second through-hole is configured to expose the second antenna connector and allow a global navigation satellite system (GNSS) antenna to connect the second antenna connector.

In an embodiment, the circuit board is further provided with a power connector exposed by the housing, and the power connector is configured to connect an in-vehicle power supply through a cigarette lighter plug.

In an embodiment, the circuit board is further provided with a light-emitting diode (LED) indicator exposed by the housing, and the LED indicator is configured to emit light of different colors for indicating different working states of the electronic tag device; the circuit board is further provided with a peripheral interface exposed by the housing, and the peripheral interface is configured to communicate with an upper computer; and the circuit board is further provided with a card slot, and the card slot is configured to connect a subscriber identity module (SIM) card.

In an embodiment, the controller is a system-on-chip (SOC) controller and includes: a memory storing the multiple sets of tag data, a processor connected to the memory, and a BLUETOOTH communication circuit connected to the processor; and the BLUETOOTH communication circuit has a first mode and a second mode, the BLUETOOTH communication circuit is configured to wirelessly connect an OBD device in the first mode, and to wirelessly connect a mobile terminal in the second mode.

In an embodiment, the BLUETOOTH communication circuit is configured to obtain, in the first mode, OBD data from the vehicle through the OBD device, and output the OBD data to the processor; the processor is configured to obtain the first target OBD data based on the OBD data obtained from the BLUETOOTH communication circuit and convert a data format of the first target OBD data to obtain the converted first target OBD data meeting ISO18000-6C; and the OBD data includes: static data including vehicle identification number (VIN), and dynamic data including at least one of a fuel tank level, odometer data and vehicle exhaust emission parameters.

In an embodiment, the vehicle exhaust emission parameters include: oxygen sensor test data, catalyst test data, and variable valve timing (VVT) test data; and the OBD data further includes: vehicle fault diagnosis data and vehicle control data.

In an embodiment, the processor is further configured to obtain second target OBD data based on the OBD data obtained from the BLUETOOTH communication circuit, and transmit the second target OBD data to the cellular communication and positioning circuit, to thereby allow the second server to obtain the second target OBD data from the cellular communication and positioning circuit.

In an embodiment, the cellular communication and positioning circuit is specifically configured to receive the second target OBD data, encrypt the second target OBD data, and wirelessly transmit the encrypted second target OBD data to the second server.

In an embodiment, the processor is further configured to obtain third target OBD data based on the OBD data obtained from the BLUETOOTH communication circuit, and transmit the third target OBD data to the BLUETOOTH communication circuit; and the BLUETOOTH communication circuit is configured to receive the third target OBD data and output, in the second mode, the third target OBD data to the mobile terminal for user viewing.

In an embodiment, the BLUETOOTH communication circuit is specifically configured to receive the third target OBD data, encrypt the third target OBD data, and wirelessly transmit, in the second mode, the encrypted third target OBD data to the mobile terminal for user viewing.

In an embodiment, each set of the multiple sets of tag data includes: an electronic product code (EPC) and a tag identifier (TID).

In an embodiment, the TIDs of the multiple sets of tag data include multiple account information corresponding to different geographical regions respectively, and the TID of the target set of tag data includes one of the multiple account information corresponding to the current geographical region being one of the different geographical regions.

In an embodiment, the cellular communication and positioning circuit includes: a positioning circuit and a cellular communication circuit; the positioning circuit supports at least one selected from the group consisting of a global positioning system (GPS), a BeiDou navigation satellite system (BDS), a Galileo satellite navigation system (GALILEO) and a global navigation satellite system (GLONASS); the cellular communication circuit is connected to the positioning circuit; the positioning circuit is configured to obtain the current positional data of the electronic tag device and transmit the current positional data to the cellular communication circuit; and the cellular communication circuit is configured to receive the current positional data, wirelessly transmit the current positional data to the second server to thereby enable the second server to output the tag data updating instruction in response to the current geographical region where the electronic tag device is located determined by the current positional data is different from the previously determined geographical region, wirelessly receive the tag data updating instruction from the second server, and transmit the tag data updating instruction to the controller.

In an embodiment, the cellular communication circuit includes: a baseband processor and a radio frequency (RF) transceiver; the baseband processor is provided with a SIM interface, and the SIM interface is configured to connect a SIM card; the RF transceiver is connected to the baseband processor; and the positioning circuit is connected to the baseband processor.

In an embodiment, the processor is configured to obtain data to be displayed, and transmit the data to be displayed to the BLUETOOTH communication circuit; and the BLUETOOTH communication circuit is configured to receive the data to be displayed, convert the data to be displayed and then output, in the second mode, the converted data to be displayed to the mobile terminal for user viewing.

In an embodiment, the first server is an authenticated electronic toll collection system (ETC) server, and the converted first target OBD data includes vehicle exhaust data meeting the ISO18000-6C; and the RFID tag circuit is further configured to encrypt the vehicle exhaust data meeting the ISO18000-6C for secured data transmission and output the encrypted vehicle exhaust data to the authenticated ETC server.

In an embodiment, the memory stores multiple OBD data request commands, and the processor is configured to select at least one OBD data request command from the multiple OBD data request commands stored in the memory to form an OBD data request command set and transmit the OBD data request command set to the BLUETOOTH communication circuit; and the BLUETOOTH communication circuit is configured to output, in the first mode, the OBD data request command set to the OBD device to thereby enable the vehicle connected to the OBD device to output the OBD data in response to the OBD data request command set.

In an embodiment, the memory stores multiple OBD data request command sets; the processor is configured to select an OBD data request command set from the multiple OBD data request command sets stored in the memory and transmit the OBD data request command set to the BLUETOOTH communication circuit; and the BLUETOOTH communication circuit is configured to output, in the first mode, the OBD data request command set to the OBD device to thereby enable the vehicle connected to the OBD device to output the OBD data in response to the OBD data request command set.

Beneficial effects of the disclosure are as follows.

The electronic tag device can achieve multiple functions, to thereby meet the actual needs of users.

In a first aspect, the electronic tag device may store the multiple sets of tag data corresponding to different geographic regions respectively, acquire the positional data in real time or periodically and transmit the positional data to the server, the server may output the tag data updating instruction when it determines that the current geographical region where the electronic tag device is located determined by the positional data is different from a previously determined geographical region, i.e., the geographical region of the electronic tag device has changed, the electronic tag device may obtain the target set of tag data corresponding to the tag data updating instruction from the multiple sets of tag data to complete tag data updating. Therefore, the electronic tag device disclosed by the disclosure is disposed on an object such as a vehicle, which can save an additional expense for toll settlement caused by an existing electronic tag device of the vehicle being bound with only one account information. It is conducive to the development of the car leasing industry.

In a second aspect, the electronic tag device may connect an OBD interface of a vehicle to obtain target OBD data; for example, the electronic tag device may connect the OBD interface of the vehicle through an external or built-in OBD device, and when the electronic tag device connects the OBD interface of the vehicle through the external OBD device, the electronic tag device may connect the external OBD device through a BLUETOOTH communication circuit; the electronic tag device may obtain the target OBD data based on the OBD data obtained from the vehicle, therefore the electronic tag device can be used in the variety of application scenes because the OBD data can be obtained. In an application scene, the processor of the electronic tag device may convert the target OBD data, the RFID tag circuit may store the converted target OBD data, the server may obtain the converted target OBD data through the RFID tag circuit, the server may be the authenticated electronic toll collection (ETC) server and the converted target OBD data may include vehicle exhaust data, the authenticated ETC server may obtain the vehicle exhaust data from the RFID tag circuit, therefore it is convenient for relevant departments such as traffic management department or environmental protection department to monitor the carbon emissions of the vehicles, and it is beneficial for the relevant departments to manage vehicles. In another application scene, the target OBD data may include vehicle basic parameters such as a fuel consumption, a driving distance, an odometer data, and a fuel tank level; in the logistics company, when a vehicle driver e.g., a truck driver drives the truck disposed with the electronic tag device, the logistics company can know driving conditions of the truck based on the target OBD data, and thus it can avoid the problem of the truck driver stealing fuel such as gasoline on the way, and the transportation cost of the logistics company can be reduced. In still another application scene, the target OBD data may include vehicle fault diagnosis data, vehicle maintenance personnel may directly obtain the vehicle fault diagnosis data for vehicle fault diagnosis and vehicle maintenance, the operation of obtaining data is simple and efficient. The electronic tag device may obtain the target OBD data based on the OBD data, and output the target OBD data through the RFID tag circuit, the cellular communication circuit and/or the BLUETOOTH communication circuit, thereby to meet actual needs, and the application scope of the electronic tag device is wider.

BRIEF DESCRIPTION OF DRAWINGS

In order to more clearly explain embodiments of the disclosure or the technical schemes in the prior art, the following will briefly introduce the drawings that need to be used in the description of the embodiments or the prior art. It is obvious that the drawings in the following description are only some of the embodiments of the disclosure. For those skilled in the art, other drawings can be obtained according to the structure shown in these drawings without paying creative work.

A realization of purposes, functional characteristics and advantages of the disclosure will be further described with reference to the attached drawings in combination with some embodiments.

DETAILED DESCRIPTION OF EMBODIMENTS

The technical schemes in the embodiments of the disclosure will be clearly and completely described below in combination with the drawings in the embodiments of the disclosure. Apparently, the described embodiments are only some of the embodiments of the disclosure, not all of them. Based on the embodiments in the disclosure, all other embodiments obtained by those skilled in the art without creative work should be within the scope of the disclosure.

In the disclosure, unless specific provisions and limitations, the terms "connect", "dispose" and etc., should be understood in a broad sense. For example, the term "connect" can be directly connected, indirectly connected through an intermediate medium, fixedly connected, a detachably connected, integrated into one, or electrically connected. It can be a connection within two elements or an interactive relationship between the two elements, unless the specific provisions and limitations, for those skilled in the art, the specific meaning of the above terms in the disclosure can be understood according to the specific situation.

In addition, the technical schemes among various embodiments can be combined with one another, but it must be based on the realization of those skilled in the art. When the combination of technical schemes is contradictory or impossible, it should be considered that the combination of technical schemes does not exist and is not within the protection scope of the disclosure.

As shown in FIGS. 1 to 4, an embodiment of the disclosure provides an electronic tag device 100. The electronic tag device 100 includes a housing 10 and a circuit board 20. The housing 10 defines an accommodating cavity 11. The circuit board 20 is detachably disposed in the accommodating cavity 11.

In some embodiments, the housing 10 includes a first cover 13 and a second cover 15. The first cover 13 and the second cover 15 together define the accommodating cavity 11. The circuit board 20 is detachably connected with the second cover 15. The first cover 13 may be connected to the second cover 15 in a snap-fitting manner.

For example, the second cover 15 may include multiple positioning columns, each positioning column is provided with threads therein, the circuit board 20 defines multiple holes corresponding to the multiple positioning columns, respectively. The multiple positioning columns pass through the corresponding holes to position the circuit board 20, bolts can be matched with the threads of the positioning columns to fix the circuit board 20 with the second cover 15.

Figure 6:
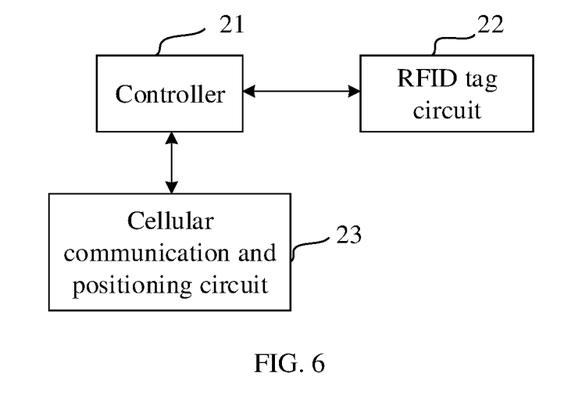
FIG. 6 illustrates a schematic block diagram of a circuit board of the electronic tag device according to an embodiment of the disclosure.

As shown in FIG. 6, the circuit board 20 is provided with a controller 21, a radio frequency identification (RFID) tag circuit 22 connected to the controller 21, and a cellular communication and positioning circuit 23 connected to the controller 21.

The controller 21 may be a system-on-chip (SOC) controller, the RFID tag circuit 22 may be a RFID tag chip, and the cellular communication and positioning circuit 23 may be a cellular communication and positioning circuit chip. In an illustrated embodiment, the SoC controller may be a chip with a model of ESP32-C3, the RFID tag chip may be a Monza® X-8K tag chip, and the cellular communication and positioning chip may be a chip with a model of SARA-R510M8S.

Figure 1:
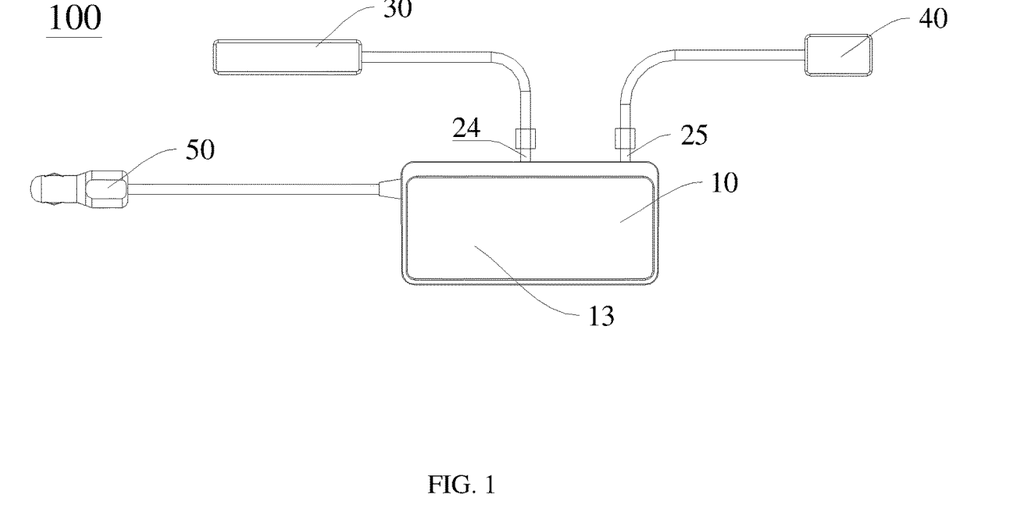
FIG. 1 illustrates a schematic structural diagram of an electronic tag device according to an embodiment of the disclosure.
Figure 2:
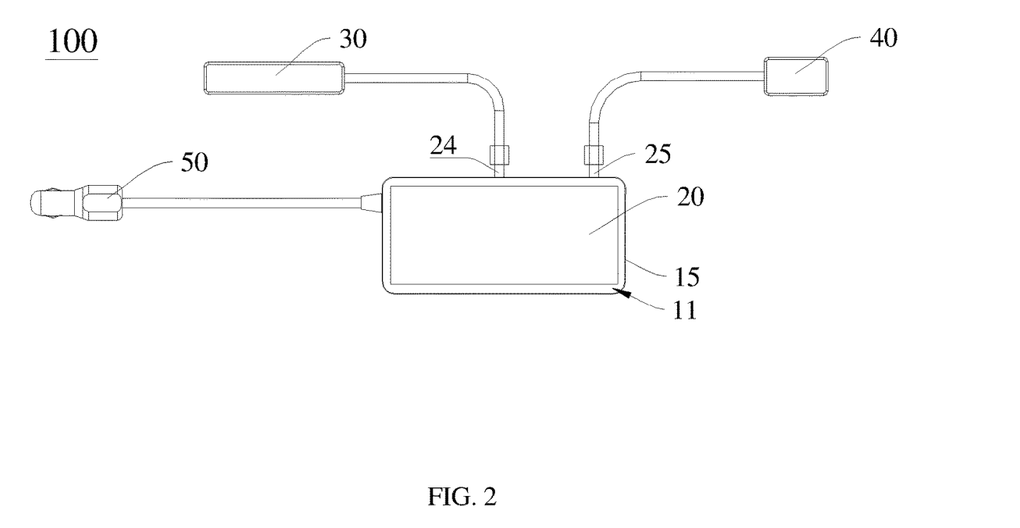
FIG. 2 illustrates a schematic structural diagram of the electronic tag device according to the embodiment of the disclosure.
Figure 3:
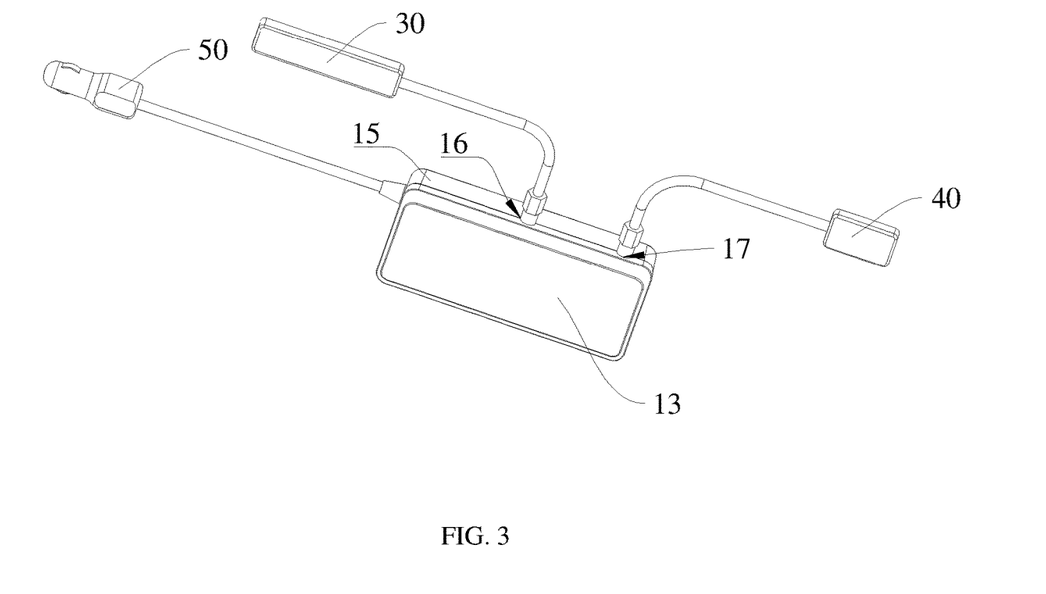
FIG. 3 illustrates a schematic structural diagram of the electronic tag device according to the embodiment of the disclosure.
Figure 8:
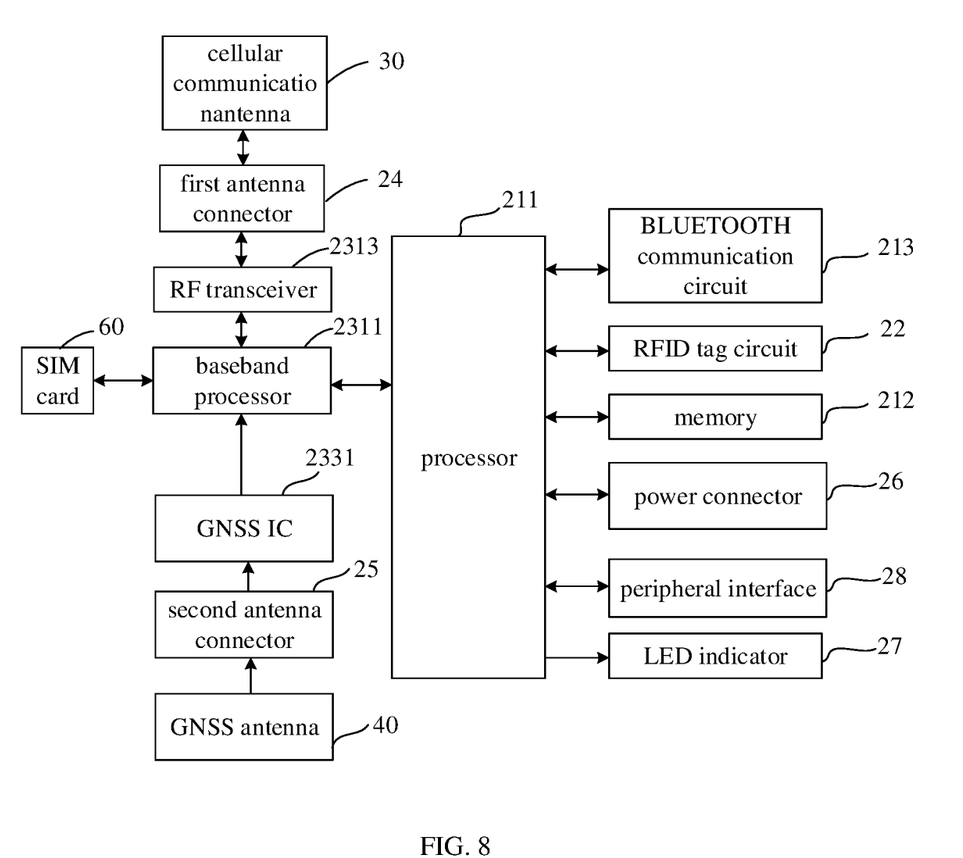
FIG. 8 illustrates a schematic block diagram of a circuit board of the electronic tag device according to an embodiment of the disclosure.

In some embodiments, as shown in FIGS. 1, 2, 4 and 8, the circuit board 20 is further provided with a first antenna connector 24 and a second antenna connector 25, which are electrically connected with the cellular communication and positioning circuit 23. As shown in FIG. 3 and FIG. 8, the housing 10 defines a first through-hole 16 and a second through-hole 17, the first through-hole 16 is configured to expose the first antenna connector 24 and allow a cellular communication antenna 30 to connect the first antenna connector 24, and the second through-hole 17 is configured to expose the second antenna connector 25 and allow a global navigation satellite system (GNSS) antenna 40 to connect the second antenna connector 25.

Figure 4:
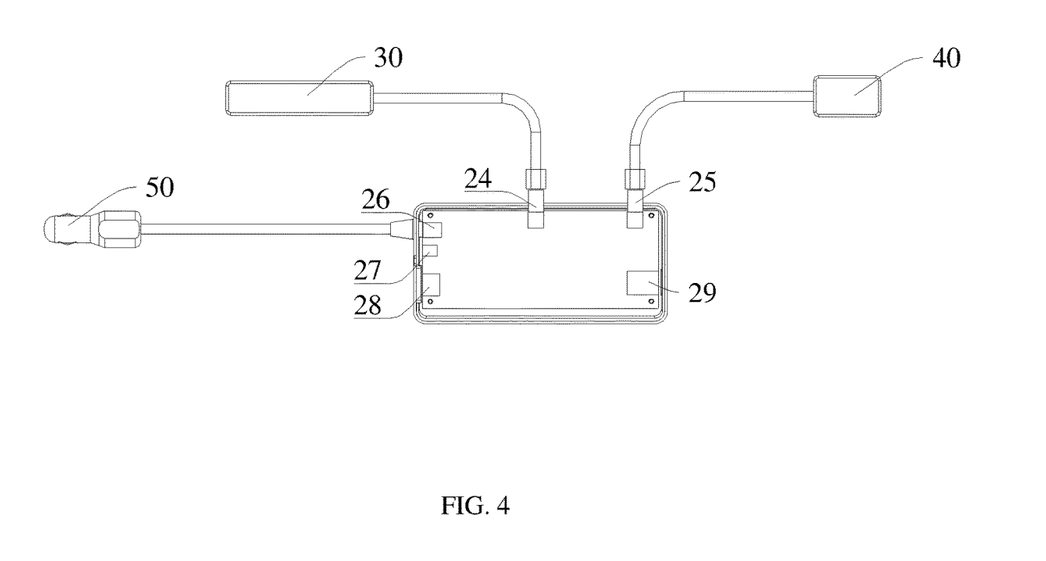
FIG. 4 illustrates a schematic structural diagram of the electronic tag device according to the embodiment of the disclosure.

In some embodiments, as shown in FIG. 4 and FIG. 8, the circuit board 20 is further provided with a power connector 26 exposed by the housing 10, and the power connector 26 is configured to connect an in-vehicle power supply through a cigarette lighter plug 50. The in-vehicle power supply may be a cigarette lighter.

In some embodiments, as shown in FIG. 4 and FIG. 8, the circuit board 20 is further provided with a light-emitting diode (LED) indicator 27 exposed by the housing 10. The LED indicator 27 is configured to emit light of different colors for indicating different working states of the electronic tag device 100. For example, when the electronic tag device 100 is in a sleep mode, the LED indicator 27 may emit first color light, when the electronic tag device 100 is in a wake-up mode, the LED indicator 27 may emit second color light, when the electronic tag device 100 is in a start-up mode, the LED indicator 27 may emit third color light, or when the electronic tag device 100 is in a power off mode, the LED indicator 27 may emit fourth color light.

In some embodiments, as shown in FIG. 4 and FIG. 8, the circuit board 20 is further provided with a peripheral interface 28 exposed by the housing 10. The peripheral interface 28 is configured to communicate with an upper computer. The upper computer may be a personal computer (PC). The peripheral interface 28 may include a universal serial bus (USB) type-C interface. Furthermore, the peripheral interface 28 may further include at least one of a general purpose input output (GPIO) interface, a serial peripheral interface (SPI) interface, a UART interface, an I2C interface and an I2S interface. The disclosure does not limit the specific type of the peripheral interface 28, and can be set according to the actual situation.

In some embodiments, the circuit board 20 is further provided with a card slot 29, and the card slot 29 is configured to connect a subscriber identity module (SIM) card. The SIM card may be a 4th generation communication system (4G) long term evolution (LTE) nano SIM card or other type cards such as 3G SIM card.

It is worth mentioning that the disclosure does not limit the specific positions of the aforementioned components on the circuit board 20, and the positions shown in the figures are only for a better understanding of the disclosure.

Figure 5:
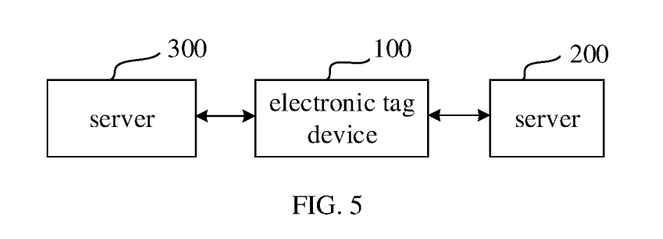
FIG. 5 illustrates a schematic diagram of an application scene of the electronic tag device according to an embodiment of the disclosure.

The electronic tag device 100 enriches the functions of the existing tag devices and can be applied to various fields, thereby to meet the needs of users. Referring to FIG. 5 and FIG. 6, the electronic tag device 100 is individually connected with a server 200 and a server 300, and thus the electronic tag device 100 can communicate with the servers 200 and 300. The RFID tag circuit 22 may be configured to connect the server 200, and the cellular communication and positioning circuit 23 may be configured to connect the server 300.

Specifically, the server 200 can be an independent physical server, or a server cluster or distributed system composed of multiple physical servers, or a cloud server or server cluster that provides cloud services, cloud databases, cloud computing, cloud functions, cloud storage, network services, cloud communications, middleware services, domain name services, security services, content delivery network (CDN), big data, artificial intelligence platforms and other basic cloud computing services. The server 200 can be a personal server, enterprise server or government server. It should be noted that the disclosure does not limit the type and source of the server 200. The server 300 may be the same as the server 200 or different from the server 200. The server 300 can also be an independent physical server, or a server cluster or distributed system composed of multiple physical servers, or a cloud server or server cluster that provides cloud services, cloud databases, cloud computing, cloud functions, cloud storage, network services, cloud communications, middleware services, domain name services, security services, content delivery network (CDN), big data, artificial intelligence platforms and other basic cloud computing services.

In an application, referring to FIGS. 5 and 6, the controller 21 is configured to obtain target on-board diagnostics (OBD) data from a vehicle and convert the target OBD data to obtain converted target OBD data meeting ISO18000-6C, and the RFID tag circuit 22 is configured to obtain the converted target OBD data meeting ISO18000-6C from the controller 21 and store the converted target OBD data meeting ISO18000-6C, to thereby allow the server 200 to obtain the converted target OBD data meeting ISO18000-6C from the RFID tag circuit 22.

In some embodiments, the target OBD data may include: vehicle basic parameters, vehicle exhaust emission parameters, vehicle fault diagnosis data, and/or vehicle control data. The vehicle basic parameters may include: current data of powertrain, vehicle identification number (VIN), and calibration identification number (CID). The vehicle exhaust emission parameters may include: oxygen sensor test data, catalyst test data, and variable valve timing (VVT) test data. The vehicle fault diagnosis data may include: freeze frame data, and confirmed diagnostic trouble code (DTC). The current data of powertrain may include, but be not limited to, engine coolant temperature, fuel control system status, fuel correction, ignition timing advance, intake air temperature, manifold air pressure, air flow, engine speed, throttle position sensor output values, secondary air status, calculated load value, vehicle speed, and fuel pressure. The freeze frame data, i.e., stored engine status data at the time of failure, may include, but be not limited to, calculated load value, engine speed, fuel correction value, fuel pressure, vehicle speed, coolant temperature, intake branch pipe pressure, closed loop or open loop operation status, and fault codes that cause the above data to be stored. In an embodiment, the target OBD data may meet the second on-board diagnostics (OBD II) standard.

In another application, referring to FIGS. 5 and 6, the cellular communication and positioning circuit 23 is configured to obtain current positional data of the electronic tag device 100 and transmit the current positional data to the server 300, to thereby enable the server 300 to output a tag data updating instruction in response to a current geographical region where the electronic tag device 100 is located determined by the current positional data is different from a previously determined geographical region, wirelessly receive the tag data updating instruction from the server 300, and transmit the tag data updating instruction to the controller 21; and the controller 21 is configured to obtain a target set of tag data corresponding to the tag data updating instruction from multiple sets of tag data and transmit the target set of tag data to the RFID tag circuit 22 for tag data updating.

In the following, the applications of the electronic tag device 100 are described in detail by way of examples.

With the global warming, issues related to carbon emissions, mainly carbon dioxide emissions, are increasingly concerned. The amount of carbon dioxide in automobile exhaust gas accounts for nearly a quarter of the total carbon dioxide emission. With the increase of vehicle ownership, the carbon dioxide emissions will also increase, thus it is necessary to detect and monitor the carbon emissions of vehicles, so that the traffic management department or environmental protection department can evaluate the implementation effect of traffic energy conservation and emission reduction measures, or find vehicles with excessive carbon emissions in the traffic system for supervision and management.

Based on this, referring to FIGS. 5 and 6, the controller 21 of the electronic tag device 100 may obtain first target OBD data from a vehicle and convert the first target OBD data to obtain converted first target OBD data meeting ISO18000-6C, and the RFID tag circuit 22 may obtain the converted first target OBD data meeting ISO18000-6C from the controller 21 and store the converted first target OBD data meeting ISO18000-6C, to thereby allow the server 200 to obtain the converted first target OBD data meeting ISO18000-6C from the RFID tag circuit 22.

The server 200 may be an authenticated electronic toll collection system (ETC) server, and the converted first target OBD data may include vehicle exhaust data meeting the ISO18000-6C. The authenticated ETC server can obtain the vehicle exhaust data meeting the ISO18000-6C from the RFID tag circuit 22, it is convenient for relevant departments such as traffic management department or environmental protection department to monitor the carbon emissions of vehicles and thus it is beneficial for the relevant departments to manage vehicles. As a result, the traffic management department or environmental protection department can evaluate the implementation effect of traffic energy conservation and emission reduction measures, and find out vehicles with excessive carbon emissions in the traffic system for supervision and management.

In addition, at present, there is a problem that automobile drivers e.g., truck drivers steal gasoline in logistics companies. That is, after driving out, truck drivers will stop halfway to steal gasoline from trucks. Because logistics companies have no way to monitor the use of gasoline, they cannot judge whether truck drivers steal gasoline, which leads to an increase in the company's operating costs.

Based on this, referring to FIGS. 5 and 6, the controller 21 of the electronic tag device 100 may obtain second target OBD data from a vehicle and transmit the second target OBD data to the cellular communication and positioning circuit 23, to thereby allow the server 300 to obtain the second target OBD data from the cellular communication and positioning circuit 23.

The second target OBD data may include the vehicle basic parameters such as a fuel consumption, a driving distance, an odometer data, and a fuel tank level. When the truck driver drives the truck disposed with the electronic tag device 100, the logistics company can know the driving conditions of the truck through communicating with the server 300, and thus it can determine whether the truck driver steal gasoline, thereby avoiding the problem of the truck driver stealing gasoline, and the transportation cost of the logistics company can be reduced.

In addition, referring to FIGS. 5 and 6, the controller 21 of the electronic tag device 100 may obtain third target OBD data from a vehicle and transmit the third target OBD data to the cellular communication and positioning circuit 23, to thereby allow the server 300 to obtain the third target OBD data from the cellular communication and positioning circuit 23. The third target OBD data may include the vehicle fault diagnosis data, thus vehicle maintenance personnel can directly obtain the vehicle fault diagnosis data for vehicle fault diagnosis and vehicle maintenance through communicating with the server 300, the operation of obtaining data is simple and efficient.

Furthermore, at present, a non-stop electronic toll collection system is an advanced road toll collection system. By installing an electronic tag device on a vehicle, when the vehicle is approaching a toll station, the electronic tag device and the toll station wirelessly communicate with each other, and then the vehicle can be recorded for subsequent toll settlement. However, in the USA, the vehicle traveling across different geographical regions, such as the vehicle traveling across different states in the USA, will encounter an additional expense for toll settlement in case of the electronic tag device of the vehicle bound with only one account information, which has a great impact on some industries, such as the car leasing industry. Generally, the car leasing is carried out at a fixed fee. When a leaseholder drives the vehicle across the different states, the vehicle will encounter the additional expense, which need to be borne by the car leasing company itself. In this way, the revenue and development of the car leasing company will be greatly affected. For example, a car leasing company registers an account for an electronic tag device in New Mexico, the electronic tag device stores account information corresponding to New Mexico, the car installed with the electronic tag device will not encounter the additional expense when being driven in New Mexico, however, when a leaseholder drives the car from New Mexico to Texas, in addition to a road toll, the car will encounter an additional expense when the car enters Texas caused by the electronic tag device of the car being bound with only the account information corresponding to the New Mexico, the additional expense can be understood as a handling fee incurred due to crossing different states, which greatly limits the development of the car leasing industry.

Based on this, the electronic tag device 100 can be installed on a vehicle, which can avoid the above additional expense. Specifically, referring to FIGS. 5 and 6, the cellular communication and positioning circuit 23 of the electronic tag device 100 may obtain current positional data of the electronic tag device 100 in real time or periodically, and transmit the current positional data to the server 300, to thereby enable the server 300 to output a tag data updating instruction in response to a current geographical region where the electronic tag device 100 is located determined by the current positional data is different from a previously determined geographical region (e.g., in response to the vehicle traveling cross the different geographical regions), wirelessly receive the tag data updating instruction from the server 300, and transmit the tag data updating instruction to the controller 21; and the controller 21 may obtain a target set of tag data corresponding to the tag data updating instruction from multiple sets of tag data and transmit the target set of tag data to the RFID tag circuit 22 for tag data updating. That is, the RFID tag circuit 22 may update a previous set of tag data to the target set of tag data to complete tag data updating. Therefore, when the vehicle is driven across the different geographical regions, no additional expense is incurred because non-local tag data (i.e., the previous set of tag data) has been replaced by local tag data (i.e., the target set of tag data). The electronic tag device 100 can be installed on the vehicle to save the additional expense for toll settlement caused by the existing electronic tag device of the vehicle being bound with only one account information, and it is conducive to the development of the car leasing industry.

Specifically, the previously determined geographical region may refer to a geographical region determined by immediately previous positional data, i.e., the previously determined geographical region may be an immediately previous determined geographical region. The current geographical region where the electronic tag device 100 is located determined by the current positional data is different from the previously determined geographical region, which can be understood that the geographical region, where the electronic tag device 100 is located, changes, i.e., the current positional data is not within a data range of the previously determined geographical region and is within a data range of the current geographical region.

In an illustrated embodiment, each set of the multiple sets of tag data may include: an electronic product code (EPC) and a tag identifier (TID).

In an illustrated embodiment, the TIDs of the multiple sets of tag data may include multiple account information corresponding to different geographical regions respectively. The different geographical regions may be different administrative regions, such as different states in the United States of America (USA). The TID of the target set of tag data may include one of the multiple account information corresponding to the current geographical region being one of the different geographical regions.

Specifically, the multiple account information corresponding to different geographical regions can be understood that the user registers accounts in the different geographical regions respectively to store the multiple account information of the geographical regions.

For example, when the RFID tag circuit 22 of the electronic tag device 100 stores the account information of the geographical region A, when a vehicle installed with the electronic tag device 100 is driven in the geographical region A, as the RFID tag circuit 22 stores local tag data of the geographical region A, no additional cost is incurred. When the vehicle is driven from the geographical regions A to B, the RFID tag circuit 22 of the electronic tag device 100 can update the account information of the geographical region A to the account information of the geographical region B, at this time, as the RFID tag circuit 22 stores local tag data of the geographical region B, and there is no the additional expense.

Figure 7:
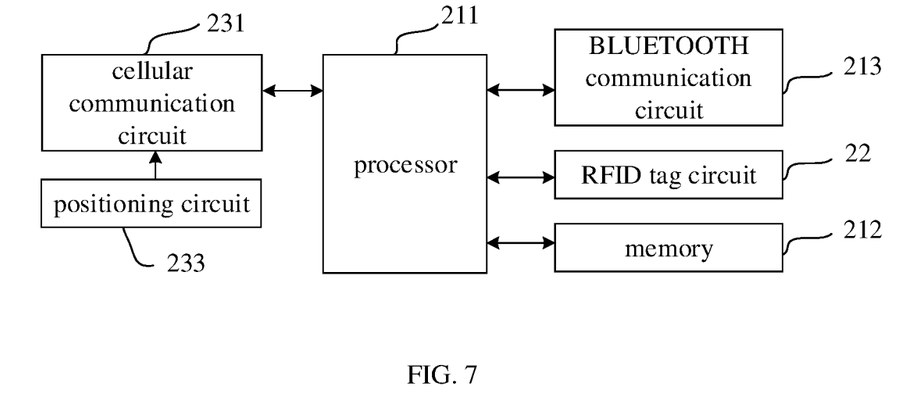
FIG. 7 illustrates a schematic block diagram of a circuit board of the electronic tag device according to an embodiment of the disclosure.

In some embodiment, as shown in FIG. 6 and FIG. 7, the controller 21 may include: a processor 211, a memory 212, and a BLUETOOTH communication circuit 213. The memory 212 may store information such as the aforementioned multiple sets of tag data. The processor 211 is connected to the memory 212. The BLUETOOTH communication circuit 213 is connected to the processor 211.

In an illustrated embodiment, the processor 211 may be a microprocessor, the memory 212 may include a static random-access memory (SRAM), and a read-only memory (ROM).

In some embodiments, the BLUETOOTH communication circuit 213 has a first mode and a second mode. The BLUETOOTH communication circuit 213 is configured to wirelessly connect an OBD device in the first mode, and to wirelessly connect a mobile terminal in the second mode.

Figure 9:
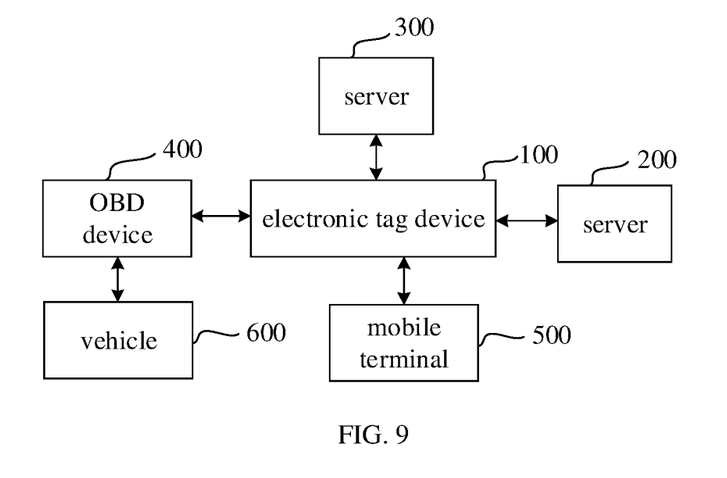
FIG. 9 illustrates a schematic diagram of another application scene of the electronic tag device according to an embodiment of the disclosure.

For example, referring to FIG. 9, the BLUETOOTH communication circuit 213 may connect an OBD device 400 in the first mode, and may connect a mobile terminal 500 in the second mode. For example, the first mode of the BLUETOOTH communication circuit 213 may be a master device mode, and the second mode of the BLUETOOTH communication circuit 213 may be a slave device mode.

The OBD device 400 may be a BLUETOOTH OBD device. The mobile terminal 500 can be a smart phone (such as a phone with android operation system, a phone with iPhone operation system (IOS), etc.), a tablet computer, a laptop, a mobile internet device (MID), a desktop computer, a smart appliance, a vehicle terminal (such as a vehicle navigation terminal, a vehicle computer, etc.), a smart watch, etc. It should be noted that the disclosure does not limit the specific type of the mobile terminal 500. For example, the mobile terminal 500 may be the smart phone of a user.

Specifically, referring to FIGS. 6 to 9, the BLUETOOTH communication circuit 213 is configured to obtain, in the first mode, OBD data from a vehicle 600 through the OBD device 400, and output the OBD data to the processor 211. The processor 211 is configured to obtain first target OBD data based on the OBD data obtained from the BLUETOOTH communication circuit 213 and convert a data format of the first target OBD data to obtain the converted first target OBD data meeting ISO18000-6C. The RFID tag circuit 22 is configured to obtain the converted first target OBD data meeting ISO18000-6C from the processor 211 and store the converted first target OBD data meeting ISO18000-6C, to thereby allow the server 200 to obtain the converted first target OBD data meeting ISO18000-6C from the RFID tag circuit 22.

In some embodiments, the OBD data may include: vehicle basic parameters, vehicle exhaust emission parameters, vehicle fault diagnosis data, and/or vehicle control data. The vehicle basic parameters may include: current data of powertrain, VIN, and CID. The vehicle exhaust emission parameters may include: oxygen sensor test data, catalyst test data, and VVT test data. The vehicle fault diagnosis data may include: freeze frame data, and confirmed DTC. The current data of powertrain include, but be not limited to, engine coolant temperature, fuel control system status, fuel correction, ignition timing advance, intake air temperature, manifold air pressure, air flow, engine speed, throttle position sensor output values, secondary air status, calculated load value, vehicle speed, and fuel pressure. The freeze frame data, i.e., stored engine status data at the time of failure, may include, but be not limited to, calculated load value, engine speed, fuel correction value, fuel pressure, vehicle speed, coolant temperature, intake branch pipe pressure, closed loop or open loop operation status, and fault codes that cause the above data to be stored. In an embodiment, the OBD data meet the second on-board diagnostics (OBD II) standard.

In an embodiment, the processor 211 is specifically configured to select at least some of the OBD data as the first target OBD data. In another embodiment, the processor 211 is specifically configured to calculate the first target OBD data based on at least some of the OBD data. The processor 211 can output the obtained OBD data directly as the first target OBD data, or calculate the first target OBD data based on the OBD data, so as to meet the needs of different OBD data in different scenes.

In some embodiments, referring to FIGS. 6 to 9, the processor 211 is configured to obtain second target OBD data based on the OBD data obtained from the BLU- ETOOTH communication circuit 213, and transmit the second target OBD data to the cellular communication and positioning circuit 23, to thereby allow the server 300 to obtain the second target OBD data from the cellular communication and positioning circuit 23.

In some embodiments, the processor 211 is specifically configured to select at least some of the OBD data as the second target OBD data, or the processor 10 is specifically configured to calculate the second target OBD data based on at least some of the OBD data. The second target OBD data may be the same as the first target OBD data or different from the first target OBD data.

In some embodiments, the cellular communication and positioning circuit 23 is specifically configured to receive the second target OBD data, encrypt the second target OBD data, and wirelessly transmit the encrypted second target OBD data to the server 300. In addition to the communication function, the cellular communication and positioning circuit 23 further has the data encryption function, which ensures the security of data transmission.

In some embodiments, the processor 211 may output different target OBD data to the RFID tag circuit 22 and the cellular communication and positioning circuit 23. In an illustrated embodiment, the processor 211 may obtain different target OBD data based on different OBD data, and then output different target OBD data to the RFID tag circuit 22 and the cellular communication and positioning circuit 23. In another illustrated embodiment, the processor 211 may obtain different target OBD data based on the same OBD data, and then output different target OBD data to the RFID tag circuit 22 and the cellular communication and positioning circuit 23.

In some embodiments, the processor 211 may output the same target OBD data to the RFID tag circuit 22 and the cellular communication and positioning circuit 23.

In some embodiments, referring to FIGS. 6 to 9, the processor 211 is configured to obtain third target OBD data based on the OBD data obtained from the BLUETOOTH communication circuit 213, and transmit the third target OBD data to the BLUETOOTH communication circuit 213; and the BLUETOOTH communication circuit 213 is configured to receive the third target OBD data and output, in the second mode, the third target OBD data to the mobile terminal 500 for user viewing.

In some embodiments, the processor 211 is specifically configured to select at least some of the OBD data as the third target OBD data, or the processor 211 is specifically configured to calculate the third target OBD data based on at least some of the OBD data.

In some embodiments, the BLUETOOTH communication circuit 213 is specifically configured to receive the third target OBD data, encrypt the third target OBD data, and wirelessly transmit the encrypted third target OBD data to the mobile terminal 500. In addition to the communication function, the BLUETOOTH communication circuit 213 further has the data encryption function, which ensures the security of data transmission.

In some embodiments, the processor 211 may output different target OBD data to the RFID tag circuit 22, the cellular communication and positioning circuit 23, and the BLUETOOTH communication circuit 213. In an illustrated embodiment, the processor 211 may obtain different target OBD data based on different OBD data, and then output different target OBD data to the RFID tag circuit 22, the cellular communication and positioning circuit 23, and the BLUETOOTH communication circuit 213. In another embodiment, the processor 211 may obtain different target OBD data based on the same OBD data, and then output different target OBD data to the RFID tag circuit 22, the cellular communication and positioning circuit 23, and the BLUETOOTH communication circuit 213.

In some embodiments, the processor 211 may output the same target OBD data to the RFID tag circuit 22, the cellular communication and positioning circuit 23, and the BLUETOOTH communication circuit 213.

Moreover, in some embodiments, the OBD data can be obtained by the following methods.

In a first method, the memory 212 may store multiple OBD data request commands, the processor 211 may select at least one OBD data request command from the multiple OBD data request commands stored in the memory 212 to form an OBD data request command set and transmit the OBD data request command set to the BLUETOOTH communication circuit 213. The BLUETOOTH communication circuit 213 may output, in the first mode, the OBD data request command set to the OBD device 400 to thereby enable the vehicle 600 connected to the OBD device 400 to output the OBD data in response to the OBD data request command set.

In a second method, the memory 212 may store multiple OBD data request command sets, the processor 211 may select an OBD data request command set from the multiple OBD data request command sets stored in the memory 212 and transmit the OBD data request command set to the BLUETOOTH communication circuit 213, the BLUETOOTH communication circuit 213 may output, in the first mode, the OBD data request command set to the OBD device 400 to thereby enable the vehicle 600 connected to the OBD device 400 to output the OBD data in response to the OBD data request command set.

It is worth mentioning here that the aforementioned embodiments are illustrated by the external OBD device 400. In practical applications, the OBD device 400 may be built-in in the electronic tag device 100. In some embodiments, the processor 211 may communicate with the built-in OBD device directly to obtain the OBD data, or the processor 211 may communicate with the built-in OBD device through the BLUETOOTH communication circuit 213 to obtain the OBD data. For example, when the OBD device 400 is built-in in the electronic tag device 100, the OBD device 400 may include a CAN (abbreviation for Controller Area Network) to UART (abbreviation for Universal Asynchronous Receiver/Transmitter) converter connected to the processor 211 and configured to connect the OBD interface of the vehicle, and the CAN to UART converter can perform data format conversion, it is convenient for the electronic tag device 100 to communicate with the vehicle 600.

In some embodiments, the BLUETOOTH communication circuit 213 may receive BLUETOOTH data from the mobile terminal 500, convert the BLUETOOTH data to obtain converted BLUETOOTH data, and transmit the converted BLUETOOTH data to the processor 211. The processor 211 can store the converted BLUETOOTH data into the memory 212.

In some embodiments, the processor 211 may obtain data to be displayed from the memory 212, and transmit the data to be displayed to the BLUETOOTH communication circuit 213. The BLUETOOTH communication circuit 213 may receive the data to be displayed, convert the data to be displayed and then output the converted data to be displayed to the mobile terminal 500 for user viewing.

The electronic tag device 100 communicates with the mobile terminal 500 through the BLUETOOTH communication circuit 213, which can transmit the data that the user needs to view to the mobile terminal 500 through the BLUETOOTH communication circuit 213 and store new data into the electronic tag device 100 through the BLUETOOTH communication circuit 213, it is convenient for the user to understand relevant information of the electronic tag device 100 and to operate the electronic tag device 100.

In an illustrated embodiment, the BLUETOOTH communication circuit 213 may include: a BLUETOOTH antenna and a BLUETOOTH transceiver connected to the BLUETOOTH antenna. The BLUETOOTH transceiver may be connected with the processor 211.

In some embodiments, as shown in FIG. 6 to FIG. 9, the cellular communication and positioning circuit 213 may include: a cellular communication circuit 231 and a positioning circuit 233. The cellular communication circuit 231 is connected to the positioning circuit 233 and the processor 211.

The positioning circuit 233 supports at least one selected from the group consisting of a global positioning system (GPS), a BeiDou navigation satellite system (BDS), a Galileo satellite navigation system (GALILEO) and a global navigation satellite system (GLONASS).

The positioning circuit 233 is configured to obtain the current positional data of the electronic tag device 100 and transmit the current positional data to the cellular communication circuit 231. The cellular communication circuit 231 is configured to receive the current positional data, wirelessly transmit the current positional data to the server 300 to thereby enable the server 300 to output the tag data updating instruction in response to the current geographical region where the electronic tag device 100 is located determined by the current positional data is different from the previously determined geographical region, wirelessly receive the tag data updating instruction from the server 300, and transmit the tag data updating instruction to the processor 211.

In an illustrated embodiment, the cellular communication circuit 231 is specifically configured to receive the current positional data, encrypt the current positional data, and wirelessly transmit the encrypted current positional data to the server 300. In addition to the communication function, the cellular communication circuit 231 further has the data encryption function, which ensures the security of data transmission.

In an illustrated embodiment, the cellular communication circuit 231 is specifically configured to wirelessly receive the tag data updating instruction after being encrypted by the server 300, decrypt the received tag data updating instruction, and transmit the decrypted tag data updating instruction to the processor 211. In addition to the communication function, the cellular communication circuit 231 further has the data decryption function, which ensures the security of data transmission.

In some embodiments, as shown in FIG. 7 and FIG. 8, the cellular communication circuit 231 may include: a baseband processor 2311 and a radio frequency (RF) transceiver 2313. The baseband processor 2311 may be provided with a SIM interface, and the SIM interface is configured to connect a SIM card 60. The RF transceiver 2313 is connected to the baseband processor 2311 and the cellular communication antenna 30. The positioning circuit 233 is connected to the baseband processor 2311.

The baseband processor 2311 may have the above communication function of the cellular communication circuit 231, and further have the above data encryption function and data decryption function of the cellular communication circuit 231.

In an illustrated embodiment, as illustrated in FIG. 8, the positioning circuit 233 may include: a GNSS IC 2331 connected to the cellular communication circuit 231 and the GNSS antenna 40. Specifically, the GNSS IC 2331 is connected to the baseband processor 2311 of the cellular communication circuit 231.

For example, the GNSS IC 2331 may be a GPS IC, the GNSS antenna 40 may be a GPS antenna. The GNSS IC 2331 may be a chip with a model of UBX-M8.

It is worth mentioning that the disclosure does not limit the specific composition of the aforementioned elements (e.g., cellular communication circuit 231, positioning circuit 233, and BLUETOOTH communication circuit 213), and other composition that can achieve the same functions are included in the disclosure.

In summary, the electronic tag device 100 provided in the disclosure has a simple structure, is easy to carry and install, and has multiple functions, which can adapt to different application scenes and meet the needs of different users.

The above are only some of the embodiments of the disclosure, which does not limit a scope of the patent of the disclosure. Without departing from the spirit and scope of the disclosure, the disclosure will also have various changes and improvements. Under the disclosure concept of the disclosure, the equivalent structural transformation made by using the description and attached drawings of the disclosure, directly or indirectly applied in other relevant technical fields, are included in the scope of patent protection of the disclosure.

What is claimed is:

1. An electronic tag device, comprising:
a housing, defining an accommodating cavity; and
a circuit board, detachably disposed in the accommodating cavity; wherein the circuit board is provided with a controller, a radio frequency identification (RFID) tag circuit connected to the controller, and a cellular communication and positioning circuit connected to the controller;
wherein the controller is configured to obtain first target on-board diagnostics (OBD) data from a vehicle and convert the first target OBD data to obtain converted first target OBD data meeting international organization for standardization (ISO) 18000-6C; and the RFID tag circuit is configured to obtain the converted first target OBD data meeting ISO18000-6C from the controller and store the converted first target OBD data meeting ISO18000-6C, to thereby allow a first server to obtain the converted first target OBD data meeting ISO18000-6C from the RFID tag circuit;
wherein the cellular communication and positioning circuit is configured to obtain current positional data of the electronic tag device and transmit the current positional data to a second server, to thereby enable the second server to output a tag data updating instruction in response to a current geographical region where the electronic tag device is located determined by the current positional data is different from a previously determined geographical region, wirelessly receive the tag data updating instruction from the second server, and transmit the tag data updating instruction to the controller; and the controller is configured to obtain a target set of tag data corresponding to the tag data updating instruction from multiple sets of tag data and transmit the target set of tag data to the RFID tag circuit for tag data updating;
wherein the circuit board is further provided with a first antenna connector and a second antenna connector, which are electrically connected with the cellular communication and positioning circuit; and wherein the housing defines a first through-hole and a second through-hole; and the first through-hole is configured to expose the first antenna connector and allow a cellular communication antenna to connect the first antenna connector, and the second through-hole is configured to expose the second antenna connector and allow a global navigation satellite system (GNSS) antenna to connect the second antenna connector.

2. The electronic tag device as claimed in claim 1, wherein the housing comprises:
 a first cover; and
 a second cover, detachably connected with the first cover and defining the accommodating cavity cooperative with the first cover;
 wherein the circuit board is detachably connected with the second cover.

3. The electronic tag device according to claim 1, wherein the circuit board is further provided with a power connector exposed by the housing, and the power connector is configured to connect an in-vehicle power supply through a cigarette lighter plug.

4. The electronic tag device as claimed in claim 1, wherein the circuit board is further provided with a light-emitting diode (LED) indicator exposed by the housing; and the LED indicator is configured to emit light of different colors for indicating different working states of the electronic tag device; and
 wherein the circuit board is further provided with a peripheral interface exposed by the housing; and the peripheral interface is configured to communicate with an upper computer; and
 wherein the circuit board is further provided with a card slot, and the card slot is configured to connect a subscriber identity module (SIM) card.

5. The electronic tag device as claimed in claim 1, wherein the controller is a system-on-chip (SOC) controller and comprises:
 a memory, storing the multiple sets of tag data;
 a processor, connected to the memory; and
 a BLUETOOTH communication circuit, connected to the processor;
 wherein the BLUETOOTH communication circuit has a first mode and a second mode; and the BLUETOOTH communication circuit is configured to wirelessly connect an OBD device in the first mode, and to wirelessly connect a mobile terminal in the second mode.

6. The electronic tag device as claimed in claim 5, wherein the BLUETOOTH communication circuit is configured to obtain, in the first mode, OBD data from the vehicle through the OBD device, and output the OBD data to the processor;
 wherein the processor is configured to obtain the first target OBD data based on the OBD data obtained from the BLUETOOTH communication circuit and convert a data format of the first target OBD data to obtain the converted first target OBD data meeting ISO18000-6C; and
 wherein the OBD data comprises: static data including vehicle identification number (VIN), and dynamic data including at least one of a fuel tank level, odometer data and vehicle exhaust emission parameters.

7. The electronic tag device according to claim 6, wherein the vehicle exhaust emission parameters comprise: oxygen sensor test data, catalyst test data, and variable valve timing (VVT) test data; and the OBD data further comprises: vehicle fault diagnosis data and vehicle control data.

8. The electronic tag device as claimed in claim 6, wherein the processor is further configured to obtain second target OBD data based on the OBD data obtained from the BLUETOOTH communication circuit, and transmit the second target OBD data to the cellular communication and positioning circuit, to thereby allow the second server to obtain the second target OBD data from the cellular communication and positioning circuit.

9. The electronic tag device as claimed in claim 8, wherein the cellular communication and positioning circuit is specifically configured to receive the second target OBD data, encrypt the second target OBD data, and wirelessly transmit the encrypted second target OBD data to the second server.

10. The electronic tag device as claimed in claim 8, wherein the processor is further configured to obtain third target OBD data based on the OBD data obtained from the BLUETOOTH communication circuit, and transmit the third target OBD data to the BLUETOOTH communication circuit; and
 wherein the BLUETOOTH communication circuit is configured to receive the third target OBD data and output, in the second mode, the third target OBD data to the mobile terminal.

11. The electronic tag device as claimed in claim 10, wherein the BLUETOOTH communication circuit is specifically configured to receive the third target OBD data, encrypt the third target OBD data, and wirelessly transmit, in the second mode, the encrypted third target OBD data to the mobile terminal.

12. The electronic tag device according to claim 1, wherein each set of the multiple sets of tag data comprises: an electronic product code (EPC) and a tag identifier (TID).

13. The electronic tag device according to claim 12, wherein the TIDs of the multiple sets of tag data comprise multiple account information corresponding to different geographical regions respectively, and the TID of the target set of tag data comprises one of the multiple account information corresponding to the current geographical region being one of the different geographical regions.

14. The electronic tag device according to claim 1, wherein the cellular communication and positioning circuit comprises:
 a positioning circuit, supporting at least one selected from the group consisting of a global positioning system (GPS), a BeiDou navigation satellite system (BDS), a Galileo satellite navigation system (GALILEO) and a global navigation satellite system (GLONASS); and
 a cellular communication circuit, connected to the positioning circuit;
 wherein the positioning circuit is configured to obtain the current positional data of the electronic tag device and transmit the current positional data to the cellular communication circuit; and
 wherein the cellular communication circuit is configured to receive the current positional data, wirelessly transmit the current positional data to the second server to thereby enable the second server to output the tag data updating instruction in response to the current geographical region where the electronic tag device is located determined by the current positional data is different from the previously determined geographical region, wirelessly receive the tag data updating instruction from the second server, and transmit the tag data updating instruction to the controller.

15. The electronic tag device according to claim 14, wherein the cellular communication circuit comprises:
- a baseband processor, provided with a SIM interface; wherein the SIM interface is configured to connect a SIM card; and
- a radio frequency (RF) transceiver, connected to the baseband processor;
- wherein the positioning circuit is connected to the baseband processor.

16. The electronic tag device as claimed in claim 1, wherein the first server is an authenticated electronic toll collection system (ETC) server, and the converted first target OBD data comprises vehicle exhaust data meeting the ISO18000-6C; and the RFID tag circuit is further configured to encrypt the vehicle exhaust data meeting the ISO18000-6C for secured data transmission and output the encrypted vehicle exhaust data to the authenticated ETC server.

17. The electronic tag device according to claim 6, wherein the memory stores a plurality of OBD data request commands;
- wherein the processor is configured to select at least one OBD data request command from the plurality of OBD data request commands stored in the memory to form an OBD data request command set and transmit the OBD data request command set to the BLUETOOTH communication circuit; and
- wherein the BLUETOOTH communication circuit is configured to output, in the first mode, the OBD data request command set to the OBD device to thereby enable the vehicle connected to the OBD device to output the OBD data in response to the OBD data request command set.

18. The electronic tag device according to claim 6, wherein the memory stores a plurality of OBD data request command sets;
- wherein the processor is configured to select an OBD data request command set from the plurality of OBD data request command sets stored in the memory and transmit the OBD data request command set to the BLUETOOTH communication circuit; and
- wherein the BLUETOOTH communication circuit is configured to output, in the first mode, the OBD data request command set to the OBD device to thereby enable the vehicle connected to the OBD device to output the OBD data in response to the OBD data request command set.

* * * * *